Fig. 2.

May 25, 1948.  P. R. ROSE  2,442,148
WARP DRIER WITH AUTOMATIC CONTROL MEANS
Filed Feb. 20, 1945   3 Sheets-Sheet 3

INVENTOR.
PAUL R. ROSE.
BY
John W. Hug.
ATTORNEY.

Patented May 25, 1948

2,442,148

UNITED STATES PATENT OFFICE 2,442,148

WARP DRIER WITH AUTOMATIC CONTROL MEANS

Paul R. Rose, East Orange, N. J., assignor to Uxbridge Worsted Co., Inc., Uxbridge, Mass., a corporation of Massachusetts Application February 20, 1945, Serial No. 578,846

3 Claims. (Cl. 34—44)

This invention relates to the control of a method and apparatus for drying lengths of material, such as warp threads or the like.

An object of the invention is to provide control means for regulating the speed of travel of the material through the drying chamber, or the temperature of conditioning air introduced into the chamber, or both, in accordance with the moisture content of the material.

Another object of the invention is to provide means for measuring the moisture content of the material as it leaves the drying chamber in combination with control means actuated by said measuring means for regulating the speed of travel of the material, the temperature within the chamber, or both.

Another object of the invention is to provide means for regulating the volume of heated air brought into contact with the material within said chamber in accordance with the speed of travel of the material within said chamber.

Another object of the invention is to provide control means for limiting the area in which heated air is brought into contact with the material within said chamber in accordance with the speed of travel of the material through the chamber.

Another object of the invention is to provide a drying chamber with air exhaust means and with conduits connected with air heating means for receiving air from said heating means and supplying air to said heating means, in combination with dampers, so that said chamber may be alternatively supplied with heated air, or the supply of heated air may be completely cut off and the heated air rapidly exhausted from the chamber.

Another object of the invention is to provide a chamber of the kind described with means for heating air to be supplied to said chamber in combination with control means for regulating the degree of heat supplied to said chamber.

Another object is to provide a practical and dependable apparatus, with control means therefor, that will be capable of meeting a wide range of varying requirements or conditions imposed by the characteristics of the material being operated upon and also conditions, such as breakage of a warp thread or the like, arising during the actual operation of the apparatus.

Another object is to provide an apparatus of substantial capacity for treatment, as by drying, of the material operated upon, and yet give the apparatus a suitable range of change of capacity to meet differing requirements of different materials undergoing treatment; another object is to provide simple, practical, and dependable controls for an apparatus of the just-mentioned character so that change-over from one requirement to another may be readily and efficiently effected.

Another object is to provide a practical and dependable system and apparatus of control for effecting removal of moisture from material such as warp so as to give the treated material a substantially uniform moisture content, in cases where complete dryness is not desired, even though the material entering the apparatus has nonuniform or different moisture content throughout its length.

Another object is to provide a practical and dependable control system and apparatus for drying material so constructed and arranged that change-over from high speed of operation to relatively low speed of operation may be quickly effected, and without impairment of the material undergoing treatment, to meet and permit correction of such operating emergencies as the breakage of a length or strand or warp of material being dried.

Another object is, in general, to provide an improved control method and apparatus for drying materials.

Other objects will be in part obvious or in part pointed out hereinafter.

The invention, accordingly, consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings, in which is shown illustratively a preferred embodiment of the mechanical features of my invention.

Fig. 3 is a diagrammatic representation of a possible circuit arrangement for effecting certain controls.

Similar reference characters refer to similar parts throughout the several views of the drawings.

Figure 1:
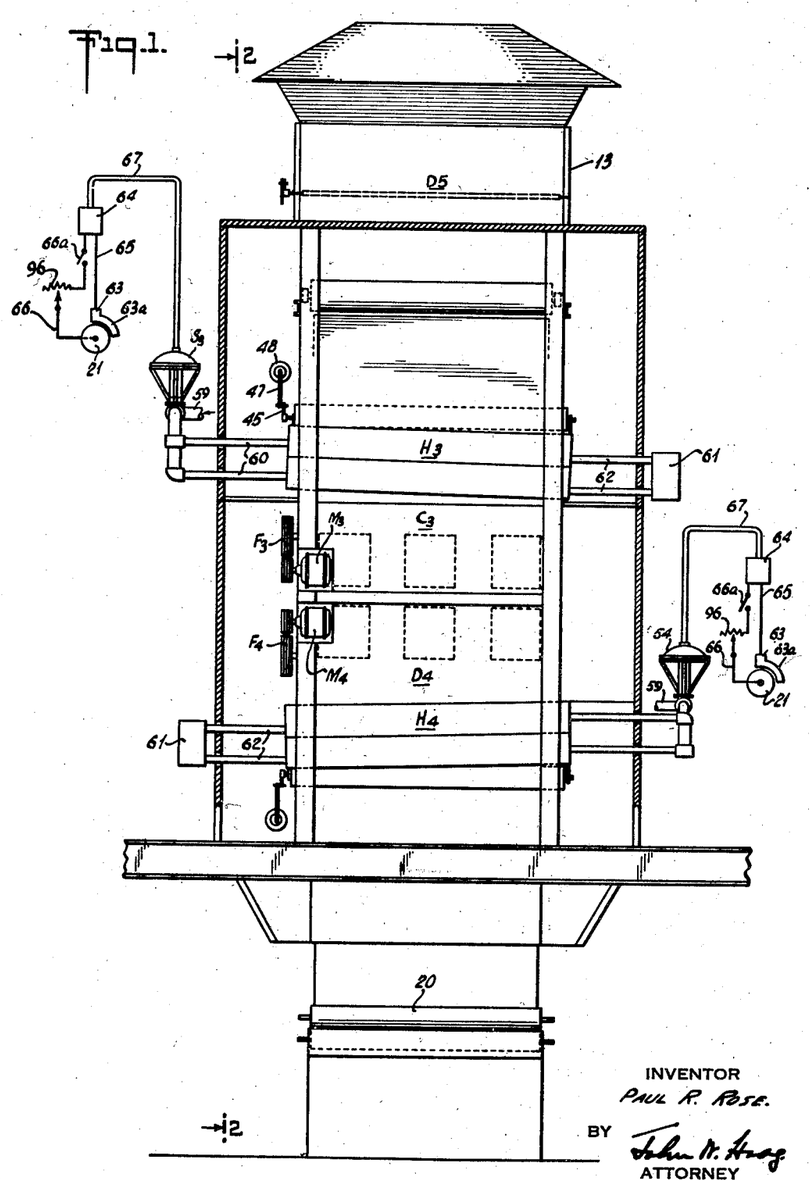
Fig. 1 is an end elevation of the apparatus.
Figure 2:
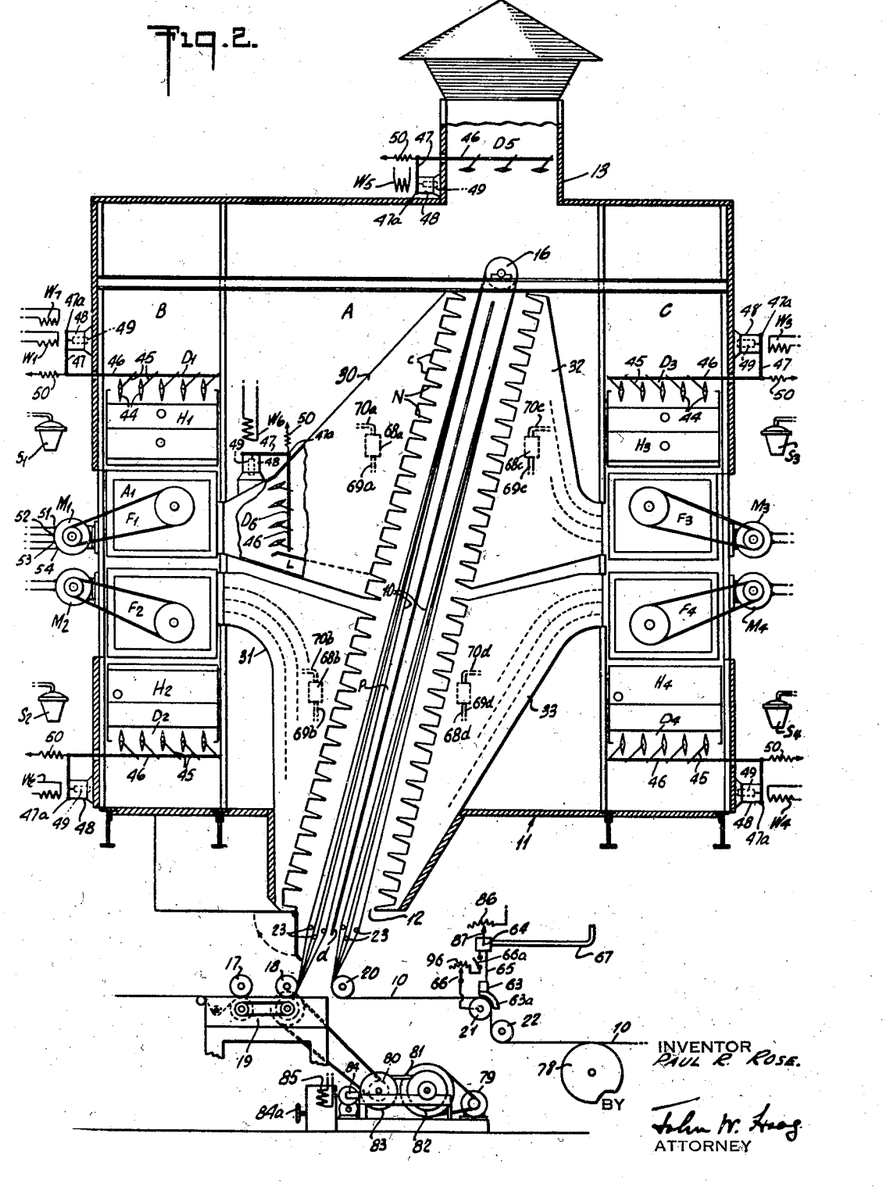
Fig. 2 is a vertical sectional view as seen along the line 2—2 of Fig. 1, certain of the parts of the apparatus being indicated diagrammatically.
Figure 5:
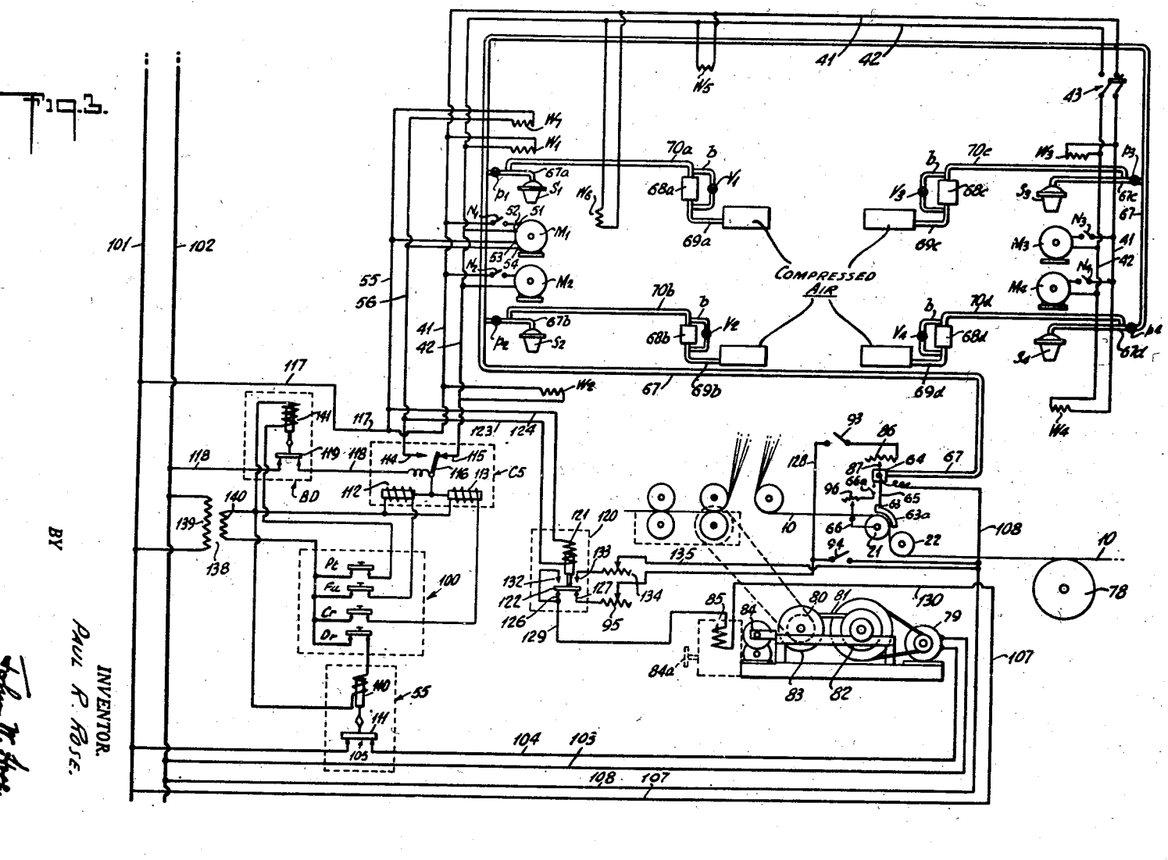

In Figs. 1 and 2 an embodiment of the invention is shown in which a length of material—such, for example, as warp 10—is passed through a channel comprising four headers 30, 31, 32, 33, each of which has air impeller means and air heating means associated with it, and means are provided with which at least one of these headers may be partially closed off so that heated air may be delivered from only a section of the header, thus limiting and controlling the area within which heated air is brought in contact with the traveling material or warp.

As illustrated in Fig. 2, the length of warp 10 is shown passing in and out of a treatment chamber 11 comprising the central vertically-extending portion A and side portions B and C. The central portion A has a bottom opening 12 and an exhaust port 13 at the top so that an upward or gravity flow of the air may be maintained through said chamber portion A. Within chamber portion A the discharge ends of headers 30 and 31 are arranged in alignment opposed to the discharge ends of headers 32 and 33, which are also in alignment, thus forming the channel P leading from the bottom opening 12 upwardly toward, and to a point adjacent to, the exhaust passage 13. At the upper end of this channel a roller 16 is provided, over which extends the material to be dried. The length of material 10, after passing through the pairs of squeeze rollers 17 and 18 of the sizing bath 19, passes upwardly within the channel P between opposed discharged ends of the headers 30, 31 and 32, 33, over the roller 16, and returns downwardly through the said channel P, in a flight which is preferably parallel to the upward flight, and then out through bottom opening 12 and around guide roller 20 and rollers 21 and 22. Both the upward and downward flights of the material are preferably divided into a plurality of planes, as by the splitter rollers 23.

The chamber portions B and C each communicate at both top and bottom with the chamber portion A, and air entering at either top or bottom passes over air heating means to air impeller means communicating with one of said headers, from which it is discharged and brought into contact with the length of material or warp 10 which is passing along the channel P.

Thus, air entering at the top of chamber B passes over heater $H_1$ to the air impeller means $F_1$ by which it is forced into header 30. Similarly, air entering the bottom of chamber B passes over heater $H_2$ into air impeller means $F_2$ by which it is forcibly discharged into header 31. Similarly, heated air passing into the top of chamber portion C passes over heater $H_3$ into air impeller means $F_3$ and header 32, and air entering at the bottom of chamber portion C passes over heater $H_4$ and into air impeller means $F_4$ and header 33.

Each header is provided with a number of air ports or nozzles N extending toward the length of material, for directing heated air against the material within channel P. The nozzles N are preferably spaced apart, thus forming U-shaped, laterally-extending channels or conduits $c$ leading to the ends of the header for receiving and returning air to be recirculated.

Above heating means $H_1$ a damper or shut-off $D_1$ is provided, comprising a suitable number of individual damper elements each rotatably mounted and all suitably connected so that all may be manipulated in unison and into open or closed positions. It will be seen that when the damper $D_1$ is closed, the in-take to air impeller means F is closed off and, consequently, no air will be supplied to passage P through header 30. On the other hand, when damper $D_1$ is opened, air will be drawn from chamber portion A by the air impeller means $F_1$ over heater means $H_1$ and discharged into passage P through header 30 by means of air ports or nozzles N.

Within header 30 a damper $D_6$ is provided, as shown, and, when closed, the damper $D_6$ serves to close off all of the nozzles or air ports of header 30 except those nozzles of section L of the header, so that, when damper $D_6$ is closed, air forced into the header 30 from air impeller means $F_1$ will be released into passage P only through the air ports or nozzles of section L of the header, and thus the area of contact of heated air with the length of material passing through passage P will be controlled and limited in extent. When damper $D_6$ is opened, air from air impeller means $F_1$ flows out of all of the nozzles N of header 30, and while part is exhausted through exhaust port 13 after passing upwardly through passage P, another portion of the air from passage P flows laterally in the trough-like passages $c$ provided between adjacent nozzles N, and around the ends of the header, and will thus be drawn to the heater means by the suction of the air impeller means and thus be caused to be recirculated and resupplied to passage P.

Exhaust port 13 is provided with a damper $D_5$ to control exit of air through the port. It will be noted, however, that preferably the individual elements of damper $D_5$ are of a size and are spaced apart in such a way that they serve to only partially close exhaust port 13 when moved into "closing" position, thus providing for the exhaust of some air from chamber 11 at all times.

As will be more fully explained, the motor $M_1$ for air impeller means $F_1$ is preferably a two-speed motor and it, together with dampers $D_1$, $D_5$, and $D_6$, is controllable in such a way that when motor $M_1$ actuates fan $F_1$ at low speed, damper $D_1$ will be open and dampers $D_5$ and $D_6$ will be closed, thus causing a reduced quantity or flow of heated air to be discharged into passage P, but only through section L of header 30, and causing a large proportion of the air flowing upwardly in channel P to be diverted into chamber portion B and sucked into air impeller means $F_1$ over heating means $H_1$, to be discharged through the nozzles N of header 30 and thus again introduced into passage P, where it is again brought into contact with material passing through passage P.

Similarly, a damper $D_2$ is provided for controlling the flow of air to air impeller means $F_2$ through the bottom of chamber portion A over heater means $H_2$; a damper $D_3$ is provided for controlling the flow of air to air impeller means $F_3$ from the top of chamber portion A over heating means $H_3$; and a damper $D_4$ is provided for controlling the flow of air to air impeller means $F_4$ through the bottom of chamber portion A over heating means $H_4$.

As indicated above, air impeller means $F_1$ is preferably provided with suitable means for reducing the amount of air supplied by it to the channel P, and such means preferably comprises an arrangement for operating it at reduced speed, such as two-speed motor $M_1$, whereby it may be at either of two speeds, hereinafter referred to as low speed, or the "crawl," and high speed. Air impeller means $F_2$, $F_3$, and $F_4$ may, if desired, be operated only at high speed, and that may take place when air impeller means $F_1$ is also actuated to operate at full speed. In other words, a preferred manner of reducing heated air supplied to material 10 when moving at "crawl" speed may be to have all the air impeller means, as illustrated herein, controlled so that when the length of material or warp 10 is moving at low speed or the "crawl," only air impeller means $F_1$ is operative and the other air impeller means $F_2$, $F_3$, and $F_4$ are not operative; but when the material 10 is traveling within its range of normal speeds, all the air impeller means (four as shown in this illustrative embodiment of the invention) $F_1$, $F_2$, $F_3$, and $F_4$ will be operating at full speed, if desired, or, according to factors such as the kind of material operated upon, speed of travel, etc., any suitable rate of air supply, as by operating less than the four impeller means, may be provided. A wide range of flexibility to meet varying requirements is thus possible.

As will be more fully explained, means are provided for measuring the moisture content of the length of material, preferably immediately after it leaves passage P, and control means responsive to the moisture content are provided to either vary the speed of travel of the material 10 or, by regulating or varying the amount of heat energy supplied to the various heating means, to thus adjust the temperature of air brought into contact with the material 10 while it is passing through the channel P, or to do both.

The various air impeller means above mentioned conveniently and preferably take the form of fans or blowers, having suitable air intakes and air outlets, and each is preferably driven by an electric motor, as indicated above, the driving connection between the motor and the air impeller taking any suitable form, such as belts and pulleys—diagrammatically indicated in the drawing; for convenience, but not by way of illustration, the air impeller means are hereinafter referred to as "blowers." Thus the blowers $F_1$, $F_2$, $F_3$, and $F_4$ are driven, respectively, by the motors $M_1$, $M_2$, $M_3$, and $M_4$, and, since these blowers, in accordance with certain features of my invention, are to be driven simultaneously, their motors are connected for this purpose to a single or common circuit 41—42, as shown in the diagram; but, since at times blowers $F_3$ and $F_4$ are not needed to operate, I provide a switch 43 in the circuit by which motors $M_3$ and $M_4$ may be cut off from the supply of energy in the circuit 41—42 thus causing blowers $F_3$ and $F_4$ to be inoperate.

The several dampers $D_1$, $D_2$, etc., are constructed in any suitable way, as diagrammatically indicated in the drawing and as earlier above described, so that the respective elements of each are operated in unison by suitable levers or linkages, so that the air channels in which they are respectfully located may be closed off when the damper elements are moved into closing position and are open for the flow of air when the damper elements are moved into open position. They are preferably controlled or actuated to assume either an open or a closed position, and any suitable means—preferably an electro-responsive means, such as a solenoid—may be employed or arranged so to actuate each damper. Conveniently the arrangement and mechanism are such that the elements of each damper are biased into closing position, as by a suitable spring or the like, and are moved and held in open position upon energization of the solenoid winding, the movable core of which is mechanically connected in any suitable way for that purpose.

For example, each damper may comprise pivotally mounted damper elements 44, each having connected thereto a lever 45 linked in any suitable way to an operating rod 46, so that all of the elements 44 may be actuated in unison. The rod 46 is in turn connected, as by a lever 47, pivoted at $47^a$, to the solenoid core 49 so that movement of the core 49, upon de-energization of the solenoid winding, is in a direction determined by a spring 50, thus moving the operating rod 46 and swinging all of the damper elements 44 into closed position. Energization of the winding that acts upon the core 49 has a reverse effect, in that the core 49 is moved in opposite direction against the action of the spring 50, positioning all of the damper elements 44 in open position and holding them in such position as long as the winding remains energized. Such a relationship is diagrammatically indicated in the drawing with respect to each of the dampers $D_1$, $D_2$, $D_3$, $D_4$, $D_5$, and $D_6$, and the windings of the respective solenoids are also diagrammatically indicated and are identified by the reference characters $W_1$, $W_2$, $W_3$, $W_4$, $W_5$, and $W_6$, respectively; each solenoid and winding is housed in a suitable casing, diagrammatically indicated at 48, and the casing 48 may carry the pivotal connection $47^a$. These windings will be seen to have electrical connection to the circuit 41—42 so that, when the switch 43 is closed and the circuit 41—42 is energized, dampers $D_1$, $D_2$, $D_3$, $D_4$, $D_5$, and $D_6$ are moved and held in open position due to the resultant energization of their respective solenoid windings, and motors $M_1$, $M_2$, $M_3$, and $M_4$ are likewise energized to drive their respective blowers. Opening of the switch 43, however, can effect cutting off not only of the drive of blowers $F_3$ and $F_4$, but also of the energization of solenoid windings $W_3$ and $W_4$, so that dampers $D_3$ and $D_4$ close and remain closed.

As above described, it is desirable at times to operate the blower $F_1$ at a lower capacity, and for this purpose preferably the motor $M_1$ is operated at a suitably lower speed. For example, motor $M_1$ may be constructed in any suitable way to be operable at two different speeds; and thus it may have windings (not shown) internally connected so that, when energized, the motor $M_1$ operates at full or high speed, the windings, when so connected, leading to motor terminals 51 and 52 which are connected, as shown, to the circuit 41—42; while, for operating at a lower speed, other windings (not shown), or the same windings rearranged, give the motor, when energized, a lower rate of speed; the motor $M_1$ may thus have additional or separate terminals 53 and 54 through which the motor $M_1$ is energized for low-speed operation, and these terminals are connected to a circuit 55—56, as shown, and hence separate from the above-described circuit 41—42. To insure that the damper $D_1$ is in open position when the motor $M_1$ is operating at reduced speed, the solenoid of damper $D_1$ is arranged to be energized from the circuit 55—56, and this may be achieved, illustratively, by providing that solenoid with an additional winding $W_7$.

Accordingly, if circuit 41—42 is de-energized and circuit 55—56 is energized, windings $W_1$, $W_2$, $W_3$, $W_4$, $W_5$, and $W_6$ are de-energized, dampers $D_2$, $D_3$, $D_4$, $D_5$, and $D_6$ are in closed position, motors $M_2$, $M_3$, and $M_4$ are at rest, and motor $M_1$, at its terminals 53, 54, and winding $W_7$ of damper $D_1$ are energized from the circuit 55—56 so that, therefore, motor $M_1$ operates at reduced speed and the damper $D_1$, on the intake side of the blower $F_1$, is open. With damper $D_6$ closed, the smaller volume of heated air passes through the section L of the header. This is the relationship of the parts when the material 10 undergoing treatment is being moved at the low or "crawl" speed above mentioned.

Heaters $H_1$, $H_2$, $H_3$, and $H_4$, which heat the air handled by the blowers $F_1$, $F_2$, $F_3$, and $F_4$ respectively, may take any suitable form for transferring heat to the air, and, by way of illustration, and preferably, these heaters comprise suitable means—such as piping, through which a suitable heating medium, such as steam, may be passed, and over the external surfaces of which the air handled by the blower is passed for corresponding heat exchange. Suitable means are provided for controlling the rate of heat energy supplied to each heater, and where the latter takes the form of steam conduits or piping, as just mentioned, each heater is preferably provided with a steam control valve to vary the rate of flow of steam, as desired. Thus heaters $H_1$, $H_2$, $H_3$, and $H_4$ are provided with diaphragm-actuated control valves $S_1$, $S_2$, $S_3$, and $S_4$, respectively, each valve being connected on its inlet side to a suitable main steam supply line 59, and on its outlet side, as by piping 60, to the inlet side of the heater—suitable provision, such as a steam trap 61 connected at the outlet pipes 62 from the heater, being made to take care of condensation and to insure the desired continuity of flow of steam in each heater.

Each of the diaphragm valves $S_1$, $S_2$, $S_3$, and $S_4$, is conveniently controlled, as to its setting or instantaneous valve opening, by pressure controlled by means including members 63 and 64, responsive to the moisture content of the material, and which control the supply of a suitable fluid under pressure to the diaphragm chamber of said valves. Arrangements of this kind are well known and therefore need not be described in any detail, and in the drawing they are only diagrammatically indicated.

Thus for example a moisture content measuring device 63 of known kind is positioned in close relation to the roller 21 with its curved or shoe portion 63ª partly surrounding the surface of roller 21. Member 63 is electrically connected by conductor 65 to the member 64 which contains a relay operated diaphragm, (not shown), which is also connected by conductor 66 to the roller 21. A circuit through conductor 65, member 63, roller 21, and conductor 66 and the aforesaid relay is energized by a source of energy not shown and the current flowing in this circuit depends upon and is modified by the moisture content of the material 10 passing between roller 21 and shoe 63ª, the material 10 serving as a dielectric between the said roller and the said shoe. Variations in current transmitted to said relay resulting from variations in the moisture content of said dielectric (the warp or other material being treated) affect the position of said diaphragm positioned within member 64 which in turn controls the fluid pressure within fluid conduit 67, which, together with branch conduits 67ª, 67ᵇ, 67ᶜ, and 67ᵈ (Fig. 3) interconnect said member 64 and the diaphragm chamber of said valves $S_1$, $S_2$, $S_3$, and $S_4$, respectively. Thus through members 63 and 64 the air pressure supplied to the diaphragm chambers of the said valves is modified and varied according to the moisture content of the material, thereby to adjust the valve openings of said valves to the desired and corresponding extent, thereby varying the heat energy supplied to the heaters $H_1$, $H_2$, $H_3$, and $H_4$.

As described above, changes in the moisture content of material 10 measured by the devices 63 and 64 will open or close the valves $S_1$, $S_2$, $S_3$, and $S_4$, to the same extent. Petcocks $p$ are provided in each of said branch conduits 67ª, 67ᵇ, 67ᶜ, and 67ᵈ so that they may be individually connected or disconnected with conduit 67 whereby any one or more of said heaters $H_1$, $H_2$, $H_3$, and $H_4$ may be supplied with heat or left unsupplied, thus providing a device with a high degree of control flexibility.

In some cases, as for example in the drying of materials which are liable to case harden and thereby impede the escape of moisture it may be desirable to supply two or more of the headers with air heated to different temperatures. Thus for example in the treatment of coated fabric, including oilcloth, automobile tops, varnished cambric, resin treated fabrics, coated paper, and the like, it may be desirable to progressively modify the temperature of the air supplied to headers 31, 30, 32, and 33. For this purpose thermostat devices 68ª, 68ᵇ, 68ᶜ, and 68ᵈ, of known kind and therefore diagrammatically indicated in the drawings, are located in each of the headers, respectively, each of said thermostat devices being supplied with compressed air through conduits 69ª, 69ᵇ, 69ᶜ, and 69ᵈ respectively, from a suitable source of compressed air, and each being connected by the fluid conduits, 70ª, 70ᵇ, 70ᶜ, and 70ᵈ respectively, (Fig. 3) with its related and corresponding diaphragm valve. Thus by the several thermostat control means 68ª, 68ᵇ, 68ᶜ, and 68ᵈ, the heaters $H_1$, $H_2$, $H_3$, and $H_4$, can be separately and differentially controlled, to heat the headers to different temperatures if desired, and this control may be employed as an alternative for the uniform control of all of the heaters through the members 63 and 64, which uniform control may be cut out as for example by opening a switch 66ª in the electrical circuit between members 63 and 64. Channel P may be divided as by a partition $d$.

To further increase the flexibility of the operation and control of my apparatus I supply the switches $N_1$, $N_2$, $N_3$, and $N_4$ in the full speed electric circuit of motor $M_1$, and similarly in the circuits of motors $M_2$, $M_3$, and $M_4$, so that if it is desired to cut out the supply of heated air to any one or more of said headers by closing any one or more of said cocks $p^1$, $p^2$, $p^3$, and $p^4$ the flow of air to said header or headers, while under control of members 63 and 64, may be similarly cut out if desired. Similarly if instead of the central heat control by means of members 63 and 64, heat control individual to the headers is being employed, utilizing one or more of the thermostatic control means 68ª, 68ᵇ, 68ᶜ, and 68ᵈ, individual to said headers, and it is desired to supply heated air to only one or more of the headers, the supply of air to the unheated headers may be cut out by opening the switch or switches $N_1$, $N_2$, $N_3$, $N_4$ corresponding to the headers to which the heat supply has been cut off.

Since it is desirable, at times and as above indicated, that the rate of travel of the material 10 through the apparatus be varied, I provide suitable means for controllably changing or varying the rate of drive of the squeeze rollers 17 and 18 and of the take-off rollers 20, 21, and 22, and of the capstan roller or drum 78, and for this purpose I may interpose between the main drive motor 79 and the shaft of the main drive pulley 80, a variable-speed transmission, such as the well-known Reeves type of belt-drive, in which the belt 81 runs over sheaves 82 and 83, each having juxtaposed frusto-conical sheave faces and the ratio of drive between which can be varied by bringing the sheave elements of one sheave closer together while enlarging the spacing between the elements of the other sheave, thus to decrease the effective driving diameter of the one and increase the driving diameter of the other. This well-known type of variable-speed drive may, as is well known, have its mechanism for changing the drive ratio arranged to be controlled by an electro-magnet or solenoid, or so-called servomotor, so that change in ratio of drive follows substantially change in electric energization of the control winding or windings, and, since such an arrangement is well known, it need not be shown or described in detail, and in the drawing the ratio-changing mechanism is only diagrammatically indicated at 84, and the control winding or windings diagrammatically represented by a single winding 85.

The winding 85 may be energized from the circuit 107—108 and its energization made variable, as by a variable resistance or rheostat 86—87, the arm 87 of which may be actuated by means responsive to the moisture content of the material 10 as it emerges from the channel P of the apparatus, such as the moisture-responsive means 63 and 64 described above.

If the moisture content of the emerging material is too high, rheostat 86—87 is actuated in a direction to lessen the energization of speed-control winding 85, and thus effect decrease in the speed of travel of the material 10, and heater control means 64 acts through fluid conduit 67 to achieve increased opening of the steam supply valves S1, S2, S3, and S4, thereby to increase the heat energy supplied to the heaters. Reverse actions take place if the moisture content of the emerging material is too low. Thus it is possible to co-ordinate both the rate of travel of the material 10 and the heat energy supplied to the heaters so that the material 10 emerges from the apparatus with the desired moisture content.

In addition to controlling the heat supplied to heaters H1, H2, H3, and H4 the moisture-responsive mechanism 63—64, through rheostat 86—87, varies the rate of drive of the material 10, increasing it if the moisture content is too low and decreasing it if the moisture content of the emerging material is too high. Each of the branch connections 67$^a$, 67$^b$, 67$^c$, and 67$^d$, from fluid conduit 67 to the valves S1, S2, S3, and S4, is supplied with a petcock $p$ by which control of the heaters by the fluid in conduit 67 may be cut out if desired, and thus, under some circumstances, by varying only its rate of travel the material can be made to emerge from the dryer at substantially constant moisture content.

Under other circumstances it may be desirable to let the material 10 pass through the apparatus at a substantially fixed speed and vary the amount of heat transfer to the air discharged onto the material by whatever blowers are made to be operative. In such case the speed-varying rheostat 86—87 may be cut out of the circuit, as by a switch 93, in which case the circuit of speed-control winding 85 is and remains de-energized, and the speed of drive by the variable speed transmission set at any desired value by hand, the mechanism 84 being provided with a manual control 84$^a$ which may be employed in place of the winding 85. Or the rheostat 86—87 may be shunted out of the circuit by a switch 94, thus leaving the winding 85 energized, but not under the control of the moisture-responsive rheostat 86—87, and the speed of drive of the material 10 may then be manually set by setting a variable resistance 95 to energize the winding 85 to the extent corresponding to the desired speed of drive. Manual rheosat 95 is so arranged in the circuit of winding 85 that, with switch 94 open and switch 93 closed, so that moisture-responsive rheostat 86—87 controls the speed of drive, the variable resistance 95 may be manually set to adjust or set the standard of speed from which the moisture-responsive rheostat 86—87 is to cause variation in speed according to the moisture content of the emerging material; and in the circuit between members 63 and 64 I may include a variable resistance 96 which may be manually set to determine the standard from which the moisture-responsive heat-control means is to vary upwardly or downwardly the flow of heat energy to the various heaters. Thus a wide variety of operating conditions may be set up to meet a wide range of practical requirements.

If the control through members 63 and 64 is cut out as by opening switch 66$^a$ the control of the speed of travel of the material, within its range of normal speeds, will be entirely through the Reeves speed control means, and the control of the heat supplied to the individual headers may be controlled individually for each header by the thermostat means 68$^a$, 68$^b$, 68$^c$, and 68$^d$ associated respectively with said headers, so that the material being dryed may be subjected to different degrees of heat at different stages in its travel, and thus also the material may be subjected to progressively increasing or decreasing temperatures.

I have above mentioned that under certain conditions, particularly when a warp breaks, it is desirable to reduce the speed of the material 10 to a "crawl" and also to decrease the flow of heated air to the moving material in the apparatus. Preferably the controls, according to my invention, for shifting to the "crawl" condition from any one of a number of selectable high-speed conditions, or vice versa, are interdependent or interlocked and are preferably arranged to achieve the change-over in response to actuation of a selected one of several push-button switches, and the showing in the drawing is a simplified illustrative embodiment of such a control and actuating system. It comprises a suitable panel 100 on which are mounted appropriate push-button switches—illustratively four in number and comprising normally open push-button switches Pt, Fu, Cr, and Dr—which are selectively actuated according as it is desired to initiate "crawl" operation, or full-speed operation, or to stop the apparatus. These push-button switches, through a suitable low-voltage or relay circuit, control the actuation of appropriate electro-magnetic or relay switches—illustratively three in number and generally indicated by the reference characters CS, BD, and SS. Switches BD and SS comprise a movable contactor, movable into or out of circuit-closing relation to suitable switch contacts, by means of an electro-magnetic structure preferably in the form of a solenoid and, therefore, having a movable core and a winding, the core being connected to the movable contactor by any one of several known forms of mechanisms—which, in effect, are sequence mechanisms—so operating that the first moving stroke of the core, in response to energization of the winding (and this might be a momentary energization), moves the contactor in one direction (for example, upwardly) and leaves it in upward position, the next energization and working stroke in the same direction of the core moving the contactor in reverse direction (for example, downwardly) and leaves it there, and so on; successive working strokes of the core, each in response to an energization of the winding, thus effecting movement of the contactor into successively alternating positions. Since such mechanisms are well known, it is unnecessary to show or describe any one of them in detail, and the diagrammatic mechanical connection of the core to the contactor, in each of the switches CS, BD, and SS, is to be understood to include some such type of sequence mechanism.

The positions of the parts of these switches and the resultant circuit arrangements as they appear in the drawing, represent a condition for operating at full speed, the switch parts having been moved into the positions shown as a result of the depression of buttons $Pt$, $Fu$, and $Cr$. The change-over from full speed to "crawl," or vice versa, requires only the actuation of the corresponding buttons—$Cr$ or $Fu$, as the case may be. Stopping of the blowers requires only the depression of the button $Pt$, and stopping of the drive of the material 10 requires only depression of the button $Dr$.

Energy for operating the system may be derived from main power circuit 101—102, from which extends a circuit 103—104 to the motor 79 that drives the material 10 and related mechanisms, through the variable speed transmission, circuit 103—104 being made or broken at contacts 105 of switch SS. A circuit 107—108 extends from the power line 101—102, to energize winding 85 of the speed-change mechanism 80—81.

The contactor of switch SS is controlled by a winding 110 which is arranged, when switch contactor 111 is in open position, to be energized when button switch $Dr$ is actuated. Button $Fu$ controls the winding 112, and the change switch CS, and button switch $Cr$ controls the winding 113 of this change switch CS. Switch CS has two contacts 114 and 115, respectively, connected to conductors 56 and 42, and between which a contactor 116 operates in order to connect either the circuit 55—56 or the circuit 41—42 to the power line 101—102, a conductor 117 connecting conductors 55 and 41 to line 101, while a conductor 118, in which is interposed the contacts 119 of the switch BD, connects the contactor 116 to the line 102.

With circuit 41—42 energized, blowers $F_1$, $F_2$, $F_3$, and $F_4$ operate at full speed, dampers $D_1$, $D_2$, $D_3$, $D_4$, and $D_6$ are open, and damper $D_5$ is in closed position. Heaters $H_1$, $H_2$, $H_3$, and $H_4$ are energized alternatively, either under the control of the moisture content measuring devices 63 and 64 (switch 66ᵃ closed) or by the thermostat members 68ᵃ, 68ᵇ, 68ᶜ, 68ᵈ, individual to the headers (switch 66ᵃ open). The speed of drive of the material 10 may be controlled by the moisture-responsive rheostat 86—87, or by a manual setting of the speed-control mechanism 84, as by the hand element 84ᵃ, or independently of the rheostat 86—87 (switch 93 open and switch 94 closed), by the variable resistance 95. Should factors, such as the kind of material 10 being operated upon, require a lesser capacity of heated air for its treatment, blower and heater units may be cut out of operation so as to lessen the number of units discharging heated air onto the moving material, and, by way of illustration, the opening of switch 43 in the damper and blower circuit 41—42 and the opening of the pet cocks $p^3$ and $p^4$ in branch lines 67ᶜ and 67ᵈ in the heater-control system controlled by members 63 and 64, or the opening of the valves or cocks $v^3$ and $v^4$ in the by-pass conduits $b^3$ and $b^4$ leading around thermostat members 68ᶜ and 68ᵈ respectively, if the alternative individual control of the heaters through the said thermostat devices positioned in the individual headers, is being used, blowers $F_3$ and $F_4$ and their respective heater units $H_3$ and $H_4$ are made inoperative, and their respective dampers $D_3$ and $D_4$ closed, so as not to interfere with the desired paths of movement of heated air discharged by the remaining operative unit or units.

Such may be the circuit arrangement, control, mode of operation, and the like corresponding to the full-speed condition of operation, and at any moment during such operation "crawl"-control button $Cr$ may be depressed to shift the operation over to a "crawl" condition. Actuation of the "crawl" button brings into operation several instrumentalities, of which the change switch CS may first be considered.

The "crawl" button switch $Cr$ energizes the winding 113 of change switch CS, thus moving contactor 116 away from contact 115, thus de-energizing circuit 41—42, and bringing it into engagement with contact 114, thus to energize or close the circuit 55—56; thereby there is established the above described "crawl" condition of blower operation and damper positions, in that blower $F_1$ is driven at low speed by its motor $M_1$, damper $D_1$ is held in open position by the winding $W_7$, and, due to the de-energization of circuit 41—42, damper $D_5$ is opened, damper $D_6$ is closed, blowers $F_2$, $F_3$, and $F_4$ are inoperative, and dampers $D_2$, $D_3$, and $D_4$ are closed. If, for this condition, it is desired to cut out the heaters $H_2$, $H_3$ and $H_4$, cocks $p^2$, $p^3$ and $p^4$ may be closed if the control of the heaters is from the moisture content responsive devices 63 and 64, or by opening valves $v^2$, $v^3$ and $v^4$ in by-pass conduits $b^2$, $b^3$ and $b^4$ respectively if the heaters are being controlled individually by thermostats in the individual headers, to stop the flow of heat energy to the heaters—though it will generally be found satisfactory to leave the heaters energized, inasmuch as the blowers are inoperative and the dampers are closed, so that, with respect to the heaters $H_2$, $H_3$, and $H_4$, no air is moving through them to receive heat therefrom. Blower $F_1$ operates at reduced speed to discharge the resultant smaller quantity of heated air through the channel L of the header 30, damper $D_6$ being closed.

For such condition of operation, the speed of movement of the material 10 is reduced to the "crawl" rate, and this is preferably effected automatically, in response to the actuation of the change switch from full speed to "crawl" position. Illustratively this change in speed may be effected by means of an electro-magnetic switch, generally indicated by the reference character 120 and which may be of the solenoid type, having a winding 121 and a core with contactor 122 which are held in upper position or lower position, according as the winding 121 is energized or deenergized. Conveniently the winding 121 is connected by conductors 123—124 to the circuit 55—56. Hence, when that circuit is de-energized as is the case when circuit 41—42 is energized, winding 121 is de-energized and its contactor bridges contacts 126 and 127 which are arranged in the circuit earlier above described, of the speed-control winding 85, contactor 122, at contacts 126—127, thus maintaining the circuit of winding 85 normally closed for control by the rheostat 86—87 or the variable resistance 95. This normal circuit, for full speed operation, will be seen to extend from conductor 108, rheostat 87—86, switch 93, conductor 128, resistance 95, contacts 127—126 (closed by contactor 122), conductor 129, winding 85, and, by way of conductor 130, to the conductor 107 of the circuit 107—108.

When, however, switch winding 121 is energized in changing over from full speed to "crawl" speed operation, the just-described circuit is interrupted at the contacts 126—127, thus taking control of the speed of drive away from the rheostat 87—86 or the resistance 95, and closing a circuit arranged to so energize the speed control winding 85 that it sets the speed-change mechanism to the desired ratio of speed reduction to give the "crawl" rate of drive to the material 10. This newly-established circuit, closed at back contacts 132 and 133 of switch 120, extends from conductor 107 of circuit 107—108, conductor 130, winding 85, conductor 129, contacts 132—133 (closed by contactor 122), adjustable resistance 134, and then, by way of conductor 135, back to the other side 108 of the circuit 107—108. Resistance 134 is of such a value that speed-control winding 85 is now energized so as to give the desired "crawl" rate of speed, a speed which can be varied, according to the material being treated and other factors, by the manually adjustable resistance 134.

Operation at this "crawl" rate of speed may now continue for as long a time as is necessary, usually to repair or replace broken warp or the like, as earlier above noted, and when it is desired to restore the apparatus to full speed of operation, push-button switch Fu is actuated, thus energizing winding 112 of change switch CS to disconnect circuit 55—56 from the power line 101—102 and to connect to the latter the circuit 41—42, by movement of contactor 116 away from contact 114 and into engagement with contact 115. By that operation switch winding 121 is de-energized, the "crawl" speed circuit of winding 85 is interrupted at the back contacts 132—133, and its normal high-speed control circuit restored by closure at front contacts 126—127.

Energy for operating the various push-button control switches may be derived from any suitable source, such as a transformer 138, the primary winding 139 of which may be connected to the power circuit 101—102 and the secondary winding 140 of which, which may supply a reduced or other suitable voltage, is in suitable circuit arrangement with the push-button switches and switch windings, as shown.

It is preferred to provide separate controls for the main drive motor 79 of the apparatus and for the "crawl"-speed and high-speed blower and damper circuits; for example, push-button switch Pt is connected in circuit with the winding 141 of the switch BD, which is conveniently arranged in series with the change switch CS, and push-button switch Dr, through winding 110, controls the actuation of the switch SS. Thus, during the operation of the apparatus, either at high speed or "crawl" speed, actuation of button switch Pt operates switch BD into open-circuit position, and thus either circuit 55—56 or circuit 41—42, depending upon the position of switch CS, is interrupted and the corresponding blower motors and damper windings de-energized. Likewise, during "crawl" or high-speed operation, should it be desired to halt the drive of the material 10 without interrupting the drive of the blower motors button switch Dr may be actuated to interrupt the motor circuit 103—104 by the switch SS. By suitably setting the individual thermostats 68$^a$, 68$^b$, 68$^c$ and 68$^d$, the pet cocks $p^1$, $p^2$, $p^3$ and $p^4$ in branch conduits 67$^a$, 67$^b$, 67$^c$, and 67$^d$ respectively being open if positioned between conduits 70$^a$, 70$^b$, 70$^c$ and 70$^d$ respectively, and the heater valves S$_1$, S$_2$, S$_3$ and S$_4$ respectively, the heater-control system may also be conditioned so that suitable preheating of the heaters may be effected before actual operation of the apparatus is initiated. Thus a wide flexibility of control is provided to meet various requirements of practical operation.

By connecting the fluid conduits 70$^a$, 70$^b$, 70$^c$ and 70$^d$ respectively, leading from the individual thermostatic control devices 68$^a$, 68$^b$, 68$^c$ and 68$^d$ respectively to the fluid conduits 67$^a$, 67$^b$, 67$^c$ and 67$^d$ respectively, intermediate cocks $p^1$, $p^2$, $p^3$, and $p^4$ and the valves S$_1$, S$_2$, S$_3$, and S$_4$ respectively, the said valves may be disconnected from control by said moisture measuring means 63 and controlled by said thermostatic devices 68 upon the closing of said cocks $p^1$, $p^2$, $p^3$, and $p^4$, or any of them, as may be desired, while maintaining moisture measuring means 63 operative through member 64 to control the speed varying means. In this manner the automatic control of the speed of travel of the material may be employed to provide the desired moisture content of the material as it leaves the treatment chamber, in conjunction with individual control of part or all of the heaters. Thus progressively increasing or decreasing temperatures may be provided within the treatment chamber, if desired, in conjunction with control of the speed of travel through the moisture content measuring means.

It will be seen that there is a continuous flow of air at room temperature through channel P of my device and that the temperature within channel P is controlled and modified as desired by the introduction into channel p of one or several streams of heated air. Thus as soon as the supply of heated air to the treatment chamber is shut off (as by pushing button Pt.) only unheated air will enter chamber portion A and channel P and the air which is above room temperature will be speedily exhausted from port 13, the damper elements of which are never fully closed as explained above, and replaced by air at room temperature through inlet port 12 and this will continue until equilibrium is established between the temperature in the treatment chamber and room temperature. Thus my device is adapted to cool speedily when not operating and to safeguard material contained therein.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. Apparatus for drying lengths of material comprising, a chamber having therein a pair of headers disposed so as to form between them a substantially vertical channel, said chamber having an air inlet port and an air exhaust port communicating with the respective ends of said channel, and means for passing a length of material into and out of the chamber through said channel, means for supplying heated air into said channel, said means including conduit means adapted to receive air discharged from the upper end of said channel and recirculate it into said channel, and having air heating means therein, means for controlling the flow of air in said channel including means for regulating the chamber exhaust port and means for controlling the volume of air admitted to said conduit means, means for varying the speed of travel of said length of material, means for measuring the moisture content of the material after treatment in said chamber, and means actuated by said moisture measuring means for controlling said speed varying means in inverse proportion to the moisture content of the material as measured by said moisture measuring means, means for controlling the volume of heated air supplied by said headers into said channel in accordance with the speed of travel of the material, means operable simultaneously with said speed regulating means by said moisture measuring means for regulating the temperature of the heated air supplied to said channel.

2. Apparatus for drying lengths of material comprising, a chamber having inlet and outlet ports positioned with said outlet port above said inlet port, a pair of air distributing headers positioned in opposition within said chamber forming an air channel with laterally extending branches, means positioned adjacent the outlet port of said chamber for supporting a length of material so that it may pass upwardly in said chamber with the flow of air from said inlet port to said outlet port, and so that it may pass downwardly from said support means to its exit from said chamber substantially counter to the flow of air from said inlet port to said outlet port, conduit means adapted to receive a controlled amount of air discharged from said channel and its laterally extending branches, and to recirculate it to said headers, a plurality of air heating means and a plurality of air impelling means located within said conduit means respectively, control means for said chamber outlet port and for each of said conduit means for regulating the volume of conditioned air introduced into said chamber, and the proportion of air exhausted from said chamber, means for advancing material through said chamber, means for changing the speed of said material, and means responsive to the moisture content of said material for controlling uniformly the air heating means in each of said conduits, and the volume of air recirculated through said conduits, and alternative means for individually controlling the air heating means in at least one of said conduits, and for controlling the means for regulating the volume of air recirculated through at least one of said conduits.

3. Apparatus for drying lengths of material comprising a chamber having inlet and outlet ports positioned with said outlet port above said inlet port, a number of air distributing headers disposed in opposed relation within said chamber forming between them a channel, one side at least of said channel being defined by a plurality of headers, a number of air conduits individual to said headers respectively adapted for receiving and recirculating to said headers a portion of the air discharged from said channel, means for conditioning the air in said air conduits respectively, means individual to said air conduits for regulating the volume of air which is recirculated therethrough, means for advancing material through said channel, means for measuring the moisture content of said material, means responsive to the moisture content of the material for regulating the speed of travel of the material, and other means responsive to the moisture content of said material for controlling uniformly the air conditioning means in each of said air conduits respectively, and alternate means for individually controlling the said air conditioning means in each of said conduits, means for regulating simultaneously and uniformly the volume of air which is recirculated through said conduits, and alternative means for actuating at least one of said air volume regulating means oppositely to the others.

PAUL R. ROSE.

REFERENCES CITED

The following references are of record in the file of this patent:

UNITED STATES PATENTS

| Number | Name | Date |
|---|---|---|
| 890,782 | Leclercq | June 16, 1908 |
| 992,295 | Tiemann | May 16, 1911 |
| 1,167,029 | Stickler | Jan. 4, 1916 |
| 2,008,230 | Spooner | July 16, 1935 |
| 2,107,275 | Anderson et al. | Feb. 8, 1938 |
| 2,150,445 | Jennings et al. | Mar. 14, 1939 |
| 2,166,379 | Skagerberg | July 18, 1939 |
| 2,204,802 | Gessler | June 18, 1940 |
| 2,286,731 | Hanson | June 16, 1942 |
| 2,309,961 | King | Feb. 2, 1943 |
| 2,328,078 | Kugler | Aug. 31, 1943 |
| 2,331,042 | Parkes | Oct. 5, 1943 |
| 2,345,541 | Scholze, Jr. | Mar. 28, 1944 |
| 2,346,437 | Krogh | Apr. 11, 1944 |
| 2,351,549 | Schwartz | June 13, 1944 |
| 2,358,338 | Lilja et al. | Sept. 19, 1944 |